United States Patent Office 3,845,038
Patented Oct. 29, 1974

3,845,038
2,7-BIS[2-(4-AZATRICYCLO[4.3.1.1³,⁸]UNDEC-4-YL)
ETHOXY]FLUOREN-9-ONE AND CONGENERS
Henry W. Sause, Deerfield, Ill., assignor to
G. D. Searle & Co., Chicago, Ill.
No Drawing. Filed Sept. 28, 1972, Ser. No. 292,983
Int. Cl. C07d 41/08
U.S. Cl. 260—239 B                    10 Claims

ABSTRACT OF THE DISCLOSURE

Preparation and the valuable interferon-inducing and antibiotic activities of 2,7-bis[2-(4 - azatricyclo[4.3.1.1³,⁸] undec - 4 - yl)ethoxy]fluoren - 9 - one and congeners are disclosed.

This invention relates to 2,7 - bis[azapolycycloalkyl-(lower alkoxy)] derivatives of optionally-9-oxygenated fluorene and to processes for the preparation thereof. More particularly, this invention provides new, useful, and un-obvious chemical compounds of the formula

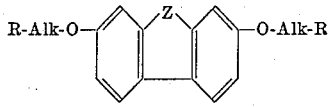

wherein R represents 4-azatricyclo[4.3.1.1³,⁸]undec-4-yl or 1,8,8 - trimethyl - 3 - azabicyclo[3.2.1]-oct-3-yl; alk represents alkylene; and Z represents methylene, hydroxymethylene, or carbonyl.

Those skilled in the art will recognize that the radicals represented by R can be depicted thus:

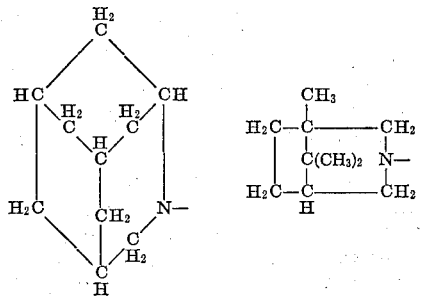

Among the alkylenes represented by Alk, lower alkylenes are preferred, including methylene, ethylene, trimethylene, propylene, tetramethylene, 1,1-dimethylethylene, pentamethylene, 2,2 - dimethyltrimethylene, and like bivalent, saturated, acyclic, straight- or branched-chain, hydrocarbon groupings of empirical formula

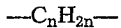

wherein $n$ represents a positive integer less than 8. When $n$ is greater than 1 and less than 4 the enformulated alkylenes are especially advantageous.

Equivalent for the purposes of this invention to the basic ethers defined by the introductory formula herein are corresponding acid addition and quaternary ammonium salts of the formula

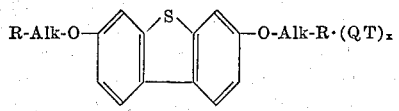

in which R, Alk, and Z retain the meanings previously assigned; Q represents hydrogen, lower alkyl, hydroxy (lower alkyl), lower alkenyl such as allyl and methylallyl, or aralkyl such as benzyl or phenethyl; T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, glycolate, succinate, malate, maleate, tartrate, citrate, gluconate, ascorbate, benzoate, cinnamate, or the like—which, in combination with the cationic portion of a salt aforesaid, is neither biologically nor otherwise undesirable; and $x$ represents a positive integer less than 3.

Likewise equivalent to the foregoing basic ethers, and also to their salts, are the solvates thereof—provided that only biologically insignificant amounts of solvent (as in hydrates, hemimethanolates, and the like) are involved.

The compounds to which this invention relates are useful by reason of their valuable biological properties. Thus, for example, they stimulate the endogenous production of interferon, which is known to prevent or counteract a multiplicity of viral infections in the animal body. They are also per se antibiotic agents effective not only against viruses including Influenza A (Strain 575) and Semliki Forest virus, but also against (1) bacteria such as *Bacillus subtilis, Escherichia coli, Salmonella paratyphi A,* and *Erwinia sp.;* protozoa such as *Trichomonas vaginalis;* (3) nematodes such as *Turbatrix aceti;* (4) fungi such as *Trichophyton mentagrophytes, Candida albicans, Fusarium sp.,* and *Verticillu albo-atrum;* and (5) algae such as *Chlorella vulgaris.*

The biolgical profile of the instant compounds is the more valuable because their acute toxicity appears to be lower than that of other known interferon inducers. Thus, for example, in a study carried out in random-bred Swiss mice, the median lethal doses ($LD_{50}$'s) of the product of Example 1D hereinafter (subsequently referred to as Compound I) was determined by intraperitoneal and intragastric administration to be 293 and >1500 mg./kg., respectively.

Those skilled in the art will recognize that interferon is commonly identified by antiviral activity which is a. wide-ranging, including both RNA and DNA viruses,
b. cell-mediated and dependent upon concomitant RNA and/or protein synthesis,
c. species specific,
d. not virucidal,
e. inactivated by proteolytic enzymes such as trypsin,
f. insensitive to nucleases, and
g. stable at pH's ranging from 2 to 10.

That the compounds of this invention induce the formation of a substance thus characterized and so identified is readily apparent from the representative results of tests carried out on Compound I as summarized in the seven subparagraphs immediately below.

Sera from mice treated with Compound I were found active against vesicular stomatitis virus (VSV) and bovine enterovirus. These viruses belong to disparate groups.

In assay cells infected with VSV and containing 0.5 γ/ml. of actinomycin D, the amount of virus which replicated during 24 hours was unaffected by the presence of serum from mice treated with Compound I. Under such conditions, the cells are unable to synthesize RNA; and any protein synthesis dependent thereupon is accordingly inhibited.

The antiviral activity induced in mice by Compound I was evident versus mouse L cells but not so versus primary chicken embryo cells.

The virucidal effect of serum from mice treated with Compound I by incubating aliquots of VSV therewith for 1 hour at 37° C. was nil.

Sera from mice treated with Compound I were incubated for 1 hour at 37° C. with and without 100 γ/ml. of crystalline trypsin, whereupon excess and equal amounts of soybean trypsin inhibitor were added and residual antiviral activity assayed. The antiviral titer was substantial where trypsin had not been present and zero where it had.

Sera from mice terated with Compound I were incubated for 1 hour at 37° C. with and without 100 γ/ml. of ribonuclease A or deoxyribonuclease I, then assayed for antiviral activity. Neither nuclease had any significant effect on the activity titer.

The pH stability of the antiviral activity induced in mice by Compound I was determined by dialysis against HCl·KCl pH 2 buffer for 24 hours, then against glycine-NaOH pH 10 buffer for 12 hours, and finally against phosphate-buffered saline until neutral. Pre- and post-dialysis assays showed no loss of antiviral activity.

Biologically effective amounts of the compounds of this invention depend, of course, upon the particular compound involved, the purpose for which it is used, the species to which it is administered, and individual response. A suggested dosage range for Compound I is 25–350 mg./kg. parenterally and 250–1000 mg./kg. by mouth.

The antiviral utility of the instant compounds is evident from the results of a standardized test for their capacity to inhibit the growth of Influenza A (Strain 575). In this test, cell cultures of primary Rhesus monkey maintained in 25-ml. plastic flasks and each containing test compound at concentrations of 625, 125, 25, 5 or 1 γ/ml. are prepared in pairs. These flasks, and an identical pair of flasks containing no test compound, are each inoculated with a dose of Influenze A (Strain 575) previously shown to produce maximum hemadsorption and minimum cytopathogenic effects after a 24-hour incubation. Where the cultures contain test compound, the virus is added 1 hour after addition of the compound to the culture. After 24-hour incubation of the cultures, the supernatant fluids are removed and 3.0 ml. of a 0.4% suspension of guinea pig erythrocytes is added to each flask. The flasks are then incubated at 4° C. in a horizontal position for 30 minutes. The flasks are rocked every 10 minutes during the incubation period. After this incubation, the red cell suspension is decanted from each flask, the flasks are washed twice with 3.0 ml. of pH phosphate buffer solution to remove unadsorbed red cells, and 3.0 ml. of distilled water is then added to lyse the adsorbed cells. The flasks are further incubated at 37° C. for 30 minutes in a horizontal position and rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, is run concurrently. The resulting hemoglobin solutions from each assay unit are read for optical density in a Beckman spectrophotometer at about 415 millicrons. A test compound is considered active if, at one of the tested levels, it reduces the optical density reading by at least 50%, relative to the virus control. Compound I was found active against Influenza A (Strain 575) at a concentration of 5 γ/ml. in the foregoing test.

Further evidence of the antiviral activity of the instant compounds is provided by the results of a standardized test for the capacity to inhibit the growth of Semliki Forest virus. This virus is a member of the group, Arboviruses. Other members of this group include Eastern, Western, and Venezuelan equine encephalitis viruses of considerable economic importance. In this test, three groups of 10 mice each are infected with 200 LD$_{50}$'s of Semliki Forest virus by intraperitoneal injection. At the same time and likewise intraperitoneally, each animal in one group receives 100 mg./kg. of test compound, each animal in a second group receives 100 mg./kg. of the well-known interferon inducer Tilorone, and each animal in the third group receives merely sterile water. The animals are then observed for a period of 14 days, and deaths are recorded. When Compound I was thus tested, 40% of the animals in the group receiving it survived, the mean day of death of the animals that died being 11.3 days, whereas none of the animals in the groups receiving Tilorone or water survived, the mean day of death in each of the latter two groups being 6.4 days. Surviving animals were sacrificed and their sera cooled and tested for anti-Semliki Forest virus antibodies. A high titer (1:640) of such antibody was found, showing that these animals had been infected with Semliki Forest virus.

The antibacterial utility of the instant compounds is evident from the results of standardized tests for their capacity to prevent growth of Bacillus subtilis, Escherichia coli, Salmonella paratyphi A, and/or Erwina sp. In these tests, nutrient broth (manufactured by Baltimore Biological Laboratories or Difco) is prepared at twice the concentration recommended by the manufacturer, sterilized, and inoculated with 2% (by volume) of a culture of B. subtilis, E. coli, S. paratyphi A or Erwina sp. Meanwhile, compound is heated in sterile distilled water at a concentration of 2000 γ/ml. and a temperature of 80° C. for 20 minutes. An equivolume mixture of this compound preparation and the inoculated broth in incubated aerobically at 37° C. and then examined grossly for growth of the test organism. The incubation is 24–48 hours for Erwina sp. and 20–24 hours for the other three organisms. If growth of the test organism is observed, the compound is considered inactive. If no such growth is observed, the incubated mixture is serially diluted and mixed with an inoculated broth of the same composition as before, excepting that the concentration is halved and 1% (by volume) of the culture instead of 2% is incorporated. Amounts of the latter broth added are such that concentrations of 100, 10, and 1γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound. Compound I was found active against B. subtilis and Erwina sp. at 10 γ/ml. in the foregoing tests. The product of Example 3D hereinafter, (subsequently referred to as Compound II) was found active against E. coli and S. paratyphi A in these tests at 100 γ/ml.

The antiprotozoal utility of the instant compounds is evident from the results of a standardized test for their capacity to immobilize Trichomonas vaginalis. In this test, 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 27,000 parts of distilled water; adjusting the pH to 6.8 with aqueous 4% sodium hydroxide; incorporating 30 parts of agar (Baltimore Biological Laboratories); boiling for one minute to dissolve the agar; and sterilizing is diluted with 20 volumes of Dubos medium serum. The resultant medium is inoculated with 2% (by volume) of either a 48-hour or a 72-hour culture of T. vaginalis. Meanwhile, compound is heated in sterile distilled water at a concentration of 2000 γ/ml. and a temperature of 80° C. for 20 minutes. An equivolume mixture of this compound preparation and the inoculated medium is incubated anerobically at 37° C. for 48 hours and then examined microscopically for the presence of motile trichomonads. If any are observed, the compound is considered inactive. If no motile trichomonads are observed, the incubated mixture is serially diluted and mixed with an inoculated medium of the same composition as that described above excepting that 54,000 parts of distilled water instead of 27,000 parts and 1% (by volume) of the culture instead of 2% are incorporated. Amounts of the latter medium added are such that concentrations of 100, 10, and 1γ of compound per ml. result. The mixtures thus obtained are incubated as before and then examined microscopically for motile trichomonads. Potency is expressed as the minimum concentration at which no motile trichomonads are discernible. Controls are provided by concurrent incubations identical with the foregoing except for the absence of compound. Compound II was found active at 100 γ/ml. in this test.

The anthelmintic utility of the instant compounds is evident from the results of a standardized test for their capacity to immobilize *Turbatrix aceti*, a representative nematode. In this test, compound is heated in sterile distilled water at a concentration of 2000 γ/ml. and a temperature of 80° C. for 20 minutes, whereupon an equivolume mixture of this compound preparation and an aqueous suspension of *T. aceti* containing approximately 2000 nematodes per ml. is incubated aerobically at room temperatures for 48 hours and then examined grossly for the presence of motile nematodes. If any are observed, the compound is considered inactive. If no motile nematodes are observed, the incubated mixture is serially diluted and mixed with a fresly-prepared and washed aqueous suspension of *T. aceti* containing approximately 1000 nematodes per ml. in amounts such that concentrations of 100, 10 and 1γ of compound per ml. result. The mixtures thus obtained are incubated as before and then examined grossly for the presence of motile nematodes. Potency is expressed as the minimum concentration at which no motile nematodes are discernible. Controls are provided by concurrent incubations identical with the foregoing except for the absence of compound. Compound II was found active at 10 γ/ml. in this test.

The antifungal utility of the instant compounds is evident from the results of standardized tests whereby two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80° C. Meanwhile, compound is heated in sterile distilled water at a concenrtation of 2000 γ/ml. and a temperature of 80° C. for 20 minutes. An equivolume mixture of this compound preparation and the double-strength agar is serially diluted and mixed with the single-strength agar in amounts such that concentrations of 1000, 100, 10, and 1γ of test compound per ml. result. The mixtures thus obtained are allowed to cool and solidify, whereupon they are surface-inoculated with a suspension of *T. mentagrophytes, C. albicans, Fusarium sp.,* or *V. albo-atrum* and then incubated aerobically at room temperatures. The incubation period is 6–7 days for *T. mentagrophytes*, 48 hours for *C. albicans*, and 5–7 days for *Fusarium sp.* and *V. albo-atrum*. Activity is determined by gross examination, and the potency is expressed as the minimum concentration at which no growth of the test organism is discernible. Controls are provided by concurrent incubations identical with the foregoing except for the absence of compound. Compound II was found active at 1000 γ/ml. in each of these tests.

The antialgal utility of the instant compounds is evident from the results of a standardized test for their capacity to prevent the growth of *Chlorella vulgaris*. In this test, a nutrient medium consisting of 0.25 gm. of sodium nitrate, 0.025 gm. of calcium chloride, 0.175 gm. of monobasic potassium phosphate, 0.075 gm. of dibasic potassium phosphate, 0.75 gm. of magnesium sulfate, 0.025 of sodium chloride, 0.005 gm. of ferric chloride, 3.0 gm. of yeast extract (Difco), and 10.0 ml. of a soil extract prepared by sterilizing a mixture of soil and distilled water and removing insoluble solids therefrom, plus sufficient additional distilled water to bring the final volume to 500 ml., is sterilized and then inoculated with 2% (by volume) of an axenic culture of *C. vulgaris*. Meanwhile, compound is heated in sterile distilled water at a concentration of 2000 γ/ml. and a temperature of 80° C. for 20 minutes. An equivolume mixture of the inoculated medium and the compound preparation is incubated aerobically at room temperatures under constant illumination for 4–7 days and then examined grossly for growth of the test organism. If such growth is observed, the compound is considered inactive. If no growth is observed, the incubated mixture is serially diluted and mixed with an inoculated medium of the same composition as that described above excepting that it is made up to a volume of 1000 ml. instead of 500 and 1% (by volume) of the culture instead of 2% is incorporated. Amounts of the latter medium added are such that concentrations of 100, 10, and 1γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound. Compounds I and II were found active at 10 γ/ml. in this test.

Those skilled in the art will recognize that observations of activity in standardized tests for particular biological effects are fundamental to the development of valuable new drugs, both veterinary and human. Distinct from such application, antialgal compounds are adapted to the conditioning of boiler feedwater and the like.

The compounds of this invention which are defined by the introductory formula when Z therein represents carbonyl or methylene are prepared by heating an alkyl halide hydrochloride of the formula

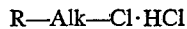
R—Alk—Cl·HCl with 2,7-diacetoxyfluorene or 2,7-diacetoxyfluoren-9-one under a nitrogen atomsphere in the presence of potassium hydroxide, using water and toluene as solvents. From the 9-oxo compound thus produced, upon conversion to the dihydrochloride and subsequent reduction with sodium borohydride in methanol solution at reduced temperatures, the corresponding 9-ols are obtained. Conversion of the basic ethers of the invention to corresponding acid addition salts is effected by admixing with one or two equivalents of any inorganic or strong organic acid wherein the anionic portion conforms to T above. Alternatively, the basic ethers can be converted to quaternary ammonium salts by contacting with a substance of the formula

Q′T wherein the definition of Q′ is identical with that of Q previously set forth excepting that Q′ does not represent hydrogen and the definition of T remains as before. Quaternization is commonly carried out at temperatures ranging from 5 to 100° C. during one hour to 5 days. A closed system is used if Q′T is a gas at operating temperatures. Using methyl bromide, the preparation of quaternary salts can usually be smoothly effected in butenone solution at 70° C., the reaction time being 1 hour.

The alkyl halides specified above for preparation of the basic ethers are obtainable from alkanols of the formula

R—Alk—OH on heating with thionyl chloride in chloroform.
Alkanols of the formula

R′—Alk—OH in which R′ represents 4-azatricyclo[4.3.1.1$^{3,8}$]undec-4-yl are prepared by heating 4-azatricyclo[4.3.1.1$^{3,8}$]undecane with a haloalkanol of the formula

Cl—Alk—OH in the presence of sodium carbonate and catalytic amounts of sodium iodide, and using tetrahydrofuran as solvent. Alternatively, alkanols of the formula

R′—Alk′—OH in which R′ is defined as before and Alk′ represents ethylene or propylene are prepared by heating 4-azatricyclo [4.3.1.1$^{3,8}$]undecane with ethylene or propylene oxide in a closed vessel, using absolute ethanol as solvent. Alkanols of the formula R"—Alk—OH wherein R" represents 1,8,8-trimethyl-3-azabicyclo[3.2.1]oct-3-yl are prepared by heating an N-hydroxyalkylcamphorimide of the formula

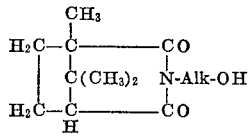

with lithium aluminum hydride under nitrogen in tetrahydrofuran.

R and Alk in the three paragraphs immediately preceding retain the meanings previously assigned.

The following examples describe compounds illustrative of the present invention and methods which have been devised for the preparations thereof. Throughout the examples hereinafter set forth, temperatures are given in degrees centigrade and relative amounts of materials in parts by weight, except as otherwise noted.

EXAMPLE 1

A. 4-Azatricyclo[4.3.1.1³,⁸]undecane-4-ethanol hydrochloride

A solution of 633 parts of 4-azatricyclo[4.3.1.1³,⁸]undecane ("4-azahomoadamantane") and 360 parts of ethylene oxide in 7900 parts of absolute alcohol is heated in a closed vessel at 110–114° for 24 hours, then cooled and filtered. The filtrate is stripped of solvent by vacuum distillation, and the residue is dissolved in ether. The ether solution is filtered, and to the filtrate is added excess hydrogen chloride dissolved in 2-propanol. The precipitate which forms is filtered off, washed with ether, and dried at 65°. The 4-azatricyclo[4.3.1.1³,⁸]undecane-4-ethanol hydrochloride thus isolated, upon recrystallization from a mixture of ethanol and ether, melts at approximately 178.5–179.5°.

B. 4-(2-Chloroethyl)-4-azatricyclo[4.3.1.1³,⁸]undecane hydrochloride

A mixture of 10 parts of 4-azatricyclo[4.3.1.1³,⁸]undecane-4-ethanol hydrochloride and approximately 49 parts of thionyl chloride is heated at around 90° for 30 minutes, then freed of excess thionyl chloride by adding dry toluene and distilling in vacuo. The residue is 4-(2-chloroethyl)-4-azatricyclo[4.3.1.1²,⁸]undecane hydrochloride.

C. 2,7-Bis[2-(4-azatricyclo[4.3.1.1³,⁸]undec-4-yl)ethoxy]fluoren-9-one

To a mixture of 790 parts of 4-(2-chloroethyl)-4-azatricyclo[4.3.1.1³,⁸]undecane hydrochloride, 376 parts of 2,7-diacetoxyfluoren-9-one, 150 parts of water, and approximately 560 parts of toluene in a nitrogen atmosphere is added, with stirring, 585 parts of 85% potassium hydroxide. The resultant mixture is heated to 85–90° and maintained thereat with stirring under nitrogen for 20 hours. The mixture is then cooled, whereupon the toluene phase is separated from the aqueous phase and the latter extracted with sufficient toluene to remove the red coloring therefrom. The toluene solutions are combined, washed with aqueous 4% sodium hydroxide, and filtered. The filtrate is dried over anhydrous sodium sulfate and then stripped of solvent by vacuum distillation. The residue, an orange powder, is 2,7-bis[2-(4-azatricyclo[4.3.1.1³,⁸]undec-4-yl)ethoxy]fluoren-9-one.

D. 2,7-Bis[2-(4-azatricyclo[4.3.1.1³,⁸]undec-4-yl)ethoxy]fluoren-9-one dihydrochloride hemihydrate To a solution of 10 parts of 2,7-bis[2-(4-azatricyclo[4.3.1.1³,⁸]undec-4-yl)ethoxy]fluoren-9-one in a minimum volume of toluene is added 10 volumes of ether, followed by 2 equivalents of hydrogen chloride dissolved in 2-propanol. The precipitate which forms is filtered out, dried in air, and recrystallized from water to give 2,7-bis[2-(4-azatricyclo[4.3.1.1³,⁸]undec-4-yl)ethoxy]fluoren - 9 - one dihydrochloride hemihydrate as an orange powder. The product has the formula

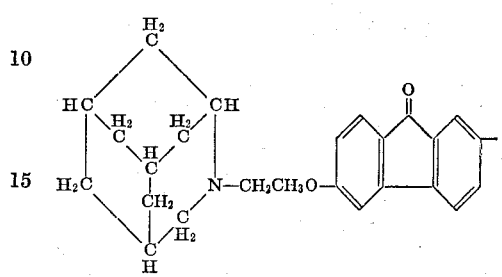

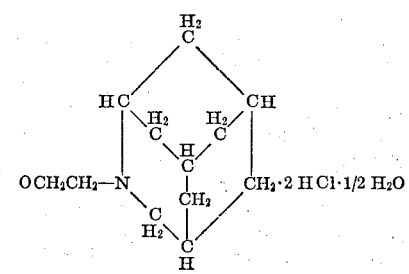

EXAMPLE 2

A. α-Methyl-4-azatricyclo[4.3.1.1³,⁸]undecane-4-ethanol hydrochloride

A solution of 151 parts of 4-azatricyclo[4.3.1.1³,⁸]undecane and 116 parts of propylene oxide in 1580 parts of absolute ethanol is heated in a closed vessel for 24 hours at 100–110°, then cooled and filtered. The filtrate is stripped of solvent by vacuum distillation. The residue is taken up in ether. The ether solution is filtered, whereupon excess hydrogen chloride dissolved in 2-propanol is added. The precipitate which forms is filtered off, dried at 60° in air, and recrystallized from a mixture of ethanol and ether to give α-methyl-4-azatricyclo[4.3.1.1³,⁸]undecane-4-ethanol hydrochloride melting at approximately 224–224.5°.

B. 4-(2-Chloropropyl)4-azatricyclo[4.3.1.1³,⁸]undecane hydrochloride

A mixture of 86 parts of α-methyl-4-azatricyclo-[4.3.1.1³,⁸]undecane-4-ethanol hydrochloride and 164 parts of thionyl chloride is heated at the boiling point under reflux for 1 hour, whereupon excess thionyl chloride is removed by adding dry toluene and distilling in vacuo. The residue is 4-(2-chloropropyl)-4-azatricyclo[4.3.1.1³,⁸]undecane hydrochloride.

C. 2,7-Bis[2-(4-azatricyclo[4.3.1.1³,⁸]undec-4-yl)propoxy]fluoren-9-one

To a mixture of 180 parts of 4-(2-chloropropyl)-4-azatricyclo[4.3.1.1³,⁸]undecane hydrochloride, 99 parts of 2,7-diacetoxyfluoren-9-one, 400 parts of water, and 1740 parts of toluene in a nitrogen atmosphere is added, with stirring, 130 parts of 85% potassium hydroxide. The resultant mixture is stirred and heated at 90° under nitrogen for 20 hours and then cooled. The toluene phase is separated from the aqueous phase, and the latter is extracted with sufficient toluene to remove the red coloring therefrom. The toluene solutions are combined, washed with aqueous 4% sodium hydroxide, dried over anhydrous sodium sulfate, and stripped of solvent by vacuum distillation. The residue is washed with methanol and dried in air to give 2,7-bis[2-(4-azatricyclo[4.3.1.1³,⁸]undec-4-yl)

propoxy]fluoren-9-one as a red glass. The product has the formula

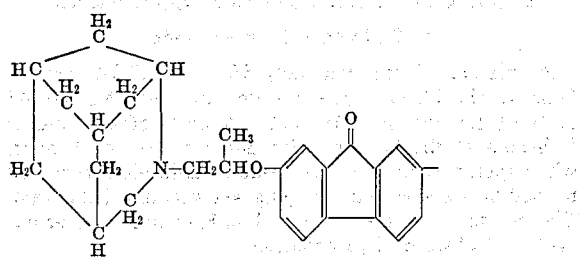

EXAMPLE 3

A. 4-Azatricyclo[4.3.1.1$^{3,8}$]undecane-4-propanol hydrochloride

To a solution of 151 parts of 4-azatricyclo[4.3.1.1$^{3,8}$] undecane in approximately 395 parts of tetrahydrofuran is consecutively added, with stirring at room temperature, a solution of 188 parts of 3-chloro-1-propanol in 450 parts of tetrahydrofuran, 84 parts of sodium bicarbonate, and 1 part of sodium iodide. The resultant mixture is stirred at the boiling point under reflux for 5 hours, then cooled and thereupon diluted with an equal volume of chloroform. Insoluble solids are filtered off and taken up in water; the aqueous solution is made alkaline and then extracted with ether; and the ether extract is combined with the filtrate. The resultant solution is dried over sodium carbonate and filtered. The filtrate is stripped of solvent by vacuum distillation. The residue is taken up in ether, and the ether solution is filtered. To the filtrate is added excess hydrogen chloride dissolved in 2-propanol. The precipitate which forms is collected by filtration, dried in air, and recrystallized from a mixture of acetone and methanol to give 4-azatricyclo[4.3.1.1$^{3,8}$]undecane-4-propanol hydrochloride which sinters at around 169.5° and melts at approximately 170.5–171.5°.

B. 4-(3-Chloropropyl)-4-azatricyclo[4.3.1.1$^{3,8}$]undecane hydrochloride

A mixture of 78 parts of 4-azatricyclo[4.3.1.1$^{3,8}$]undecane-4-propanol, 60 parts of thionyl chloride and 375 parts of chloroform is heated at the boiling point under reflux for 1 hour. The resultant solution is stripped of solvent and excess thionyl chloride by adding dry toluene and distilling in vacuo. The residue is 4-(3-chloropropyl)-4-azatricyclo[4.3.1.1$^{3,8}$]undecane hydrochloride.

C. 2,7-Bis[3-(4-azatricyclo[4.3.1.1$^{3,8}$]undec-4-yl)propoxy]fluoren-9-one To a mixture of approximately 58 parts of 4-(3-chloropropyl)-4-azatricyclo[4.3.1.1$^{3,8}$]undecane hydrochloride, approximately 59 parts of 2,7-diacetoxyfluoren-9-one, 250 parts of water, and 1080 parts of toluene in a nitrogen atmosphere is added, with stirring, 86 parts of 85% potassium hydroxide. The resultant mixture is stirred overnight at around 90° under nitrogen, then cooled to room temperature. The toluene phase is separated from the aqueous phase, and the latter is extracted with toluene. The toluene solutions are combined, washed with aqueous 4% sodium hydroxide, dried over anhydrous sodium sulfate, and stripped of solvent by vacuum distillation. The residue is 2,7-bis[3-(4-azatricyclo[4.3.1.1$^{3,8}$]undec-4-yl)propoxy]fluoren-9-one.

D. 2,7-Bis[3-(4-azatricyclo[4.3.1.1$^{3,8}$]undec-4-yl)propoxy]fluoren-9-one dihydrochloride hemihydrate Approximately 1 part of 2,7-bis[3-(4-azatricyclo[4.3.1.1$^{3,8}$]undec-4-yl)propoxy]fluoren-9-one is dissolved in a minimum amount of toluene, whereupon 10 volumes of ether followed by two equivalents of hydrogen chloride dissolved in 2-propanol is introduced. The precipitate which forms is collected by filtration, dried in air, and recrystallized from water to give 2,7-bis[3-(4-azatricyclo[4.3.1.1$^{3,8}$]undec - 4-yl)propoxy]fluoren-9-one dihydrochloride hemihydrate melting at 255–257°. The product has the formula

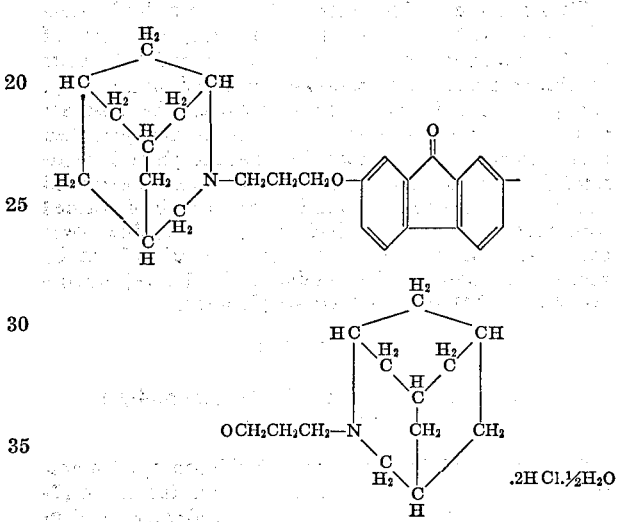

EXAMPLE 4

2,7-Bis[2-(4-azatricyclo[4.3.1.1$^{3,8}$]undec-4-yl)ethoxy]fluoren-9-ol

To a solution of approximately 128 parts of 2,7-bis[2-(4-azatricyclo[4.3.1.1$^{3,8}$]undec - 4-yl)ethoxy]fluoren - 9-one dihydrochloride hemihydrate in 1600 parts of methanol maintained at 0° is added, portionwise with stirring, 23 parts of sodium borohydride. When the addition is complete, the reaction mixture is warmed to room temperature and then freed of solvent by vacuum distillation. The residue is taken up in approximately 4% hydrochloric acid. The resultant solution is washed with ether, whereupon water is removed by vacuum distillation and the residue taken up in methanol. The methanol solution is cooled to —20° and then filtered. Solvent is again removed by vacuum distillation and the residue taken up in water. The aqueous solution is made alkaline, and the rseultant mixture is extracted with ether. The ether extract is washed with water, dried over anhydrous sodium sulfate, and stripped of solvent by vacuum distillation. The residue thus obtained is 2,7-bis[2-(4-azatricyclo[4.3.1.1$^{3,8}$]undec-4-yl)ethoxy]fluoren-9-ol.

EXAMPLE 5

2,7-Bis[2-(4-azatricyclo[4.3.1.1$^{3,8}$]undec-4-yl)propoxy]fluoren-9-ol

Substitution of approximately 124 parts of 2,7-bis[2-(4-azatricyclo[4.3.1.1$^{3,8}$]undec-4-yl)propoxy]fluoren - 9-one for the 2,7-bis[2-(4-azatricyclo[4.3.1.1$^{3,8}$]undec-4-yl)ethoxy]fluoren-9-one dihydrochloride hemihydrate called for in Example 4 affords, by the procedure there detailed, 2,7-bis[2-(4-azatricyclo[4.3.1.1$^{3,8}$]undec - 4 - yl)propoxy]fluoren-9-ol.

EXAMPLE 6

2,7-Bis[3-(4-azatricyclo[4.3.1.1³,⁸]undec-4-yl)propoxy]fluoren-9-ol

Substitution of approximately 124 parts of 2,7-bis[3-(4-azatricyclo[4.3.1.1³,⁸]undec-4-yl)propoxy]fluoren - 9-one for the 2,7-bis[2-(4-azatricyclo[4.3.1.1³,⁸]undec-4-yl)ethoxy]fluoren-9-one dihydrochloride hemihydrate called for in Example 4 affords, by the procedure there detailed, 2,7-bis[3-(4-azatricyclo[4.3.1.1³,⁸]undec - 4-yl)propoxy]fluoren-9-ol.

EXAMPLE 7

2,7-Bis[2-(4-azatricyclo[4.3.1.1³,⁸]undec-4-yl)ethoxy]fluorene

To a mixture of 330 parts of 4-(2-chloroethyl)-4-azatricyclo[4.3.1.1³,⁸]undecane hydrochloride, 160 parts of 2,7-diacetoxyfluorene, 750 parts of water, and 1080 parts of toluene in a nitrogen atmosphere is added, with stirring, 258 parts of 85% potassium hydroxide. The resultant mixture is stirred overnight at 90° under nitrogen, then cooled to room temperature. The toluene phase is separated from the aqueous phase, and the latter is extracted with toluene. The toluene solutions are combined, washed with aqueous 4% sodium hydroxide, filtered, dried over anhydrous sodium sulfate, and stripped of solvent by vacuum distillation. The residue is 2,7-bis[2-(4-azatricyclo[4.3.1.1³,⁸]undec-4-yl)ethoxy]fluorene.

EXAMPLE 8

2,7-Bis[2-(4-azatricyclo[4.3.1.1³,⁸]undec-4-yl)propoxy]fluorene

Substitution of 349 parts of 4-(2-chloropropyl)-4-azatricyclo[4.3.1.1³,⁸]undecane hydrochloride for the 4-(2-chloroethyl) - 4-azatricyclo[4.3.1.1³,⁸]undecane hydrochloride called for in Example 7 affords, by the procedure there detailed, 2,7-bis[2-(4-azatricyclo[4.3.1.1³,⁸]undec-4-yl)propoxy]fluorene.

EXAMPLE 9

2,7-Bis[-3(4-azatricyclo[4.3.1.1³,⁸]undec-4-yl)propoxy]fluorene

Substitution of 349 parts of 4-(3-chloropropyl)-4-azatricyclo[4.3.1.1³,⁸]undecane hydrochloride for the 4-(2-chloroethyl)-4-azatricyclo[4.3.1.1³,⁸]undecane hydrochloride called for in Example 7 affords, by the procedure there detailed, 2,7-bis[3-(4-azatricyclo[4.3.1.1³,⁸]undec-4-yl)propoxy]fluorene.

EXAMPLE 10

A. 1,8,8-Trimethyl-3-azatricyclo[3.2.1]octane-3-ethanol hydrochloride

To a suspension of 167 parts of lithium aluminum hydride in 2500 parts of tetrahydrofuran is added, with stirring, a solution of 481 parts of N-(2-hydroxyethyl)camphorimide in 1500 parts of tetrahydrofuran. The resultant mixture is heated with stirring at the boiling point under reflux in a nitrogen atmosphere for 18 hours, then cooled to room temperature. Stirring is continued while 176 parts of water, 132 parts of aqueous 20% sodium hydroxide, and 616 parts of water are consecutively added and the precipitate which forms becomes white and granular. The precipitate is collected on a filter and washed thereon with tetrahydrofuran. The filtrate is stripped of solvent by vacuum distillation, and the residue is taken up in ether. The ether solution is filtered, and the filtrate is precipitated by adding excess hydrogen chloride dissolved in 2-propanol. The precipitate thus obtained is filtered off and recrystallized from a mixture of ethanol and ether to give 1,8,8-trimethyl-3-azabicyclo[3.2.1]octane-3-ethanol hydrochloride melting at 225.5–227°.

B. 3-(2-Chloroethyl)-1,8,8-trimethyl-3-azabicyclo[3.2.1]octane hydrochloride A mixture of approximately 56 parts 1,8,8-trimethyl-3-azabicyclo[3.2.1]octan - 3 - ethanol hydrochloride, 43 parts of thionyl chloride, and 149 parts of chloroform is heated at the boiling point under reflux for 1 hour, whereupon solvent and excess thionyl chloride is removed by adding toluene and stripping via vacuum distillation. The residue is 3-(2-chloroethyl)-1,8,8-trimethyl-3-azabicyclo[3.2.1]octane hydrochloride.

C. 2,7-Bis[2-(1,8,8-trimethyl-3-azabicyclo[3.2.1]oct-3-yl)ethoxy]fluoren-9-one To a mixture consisting of 605 parts of 3-(2-chloroethyl) - 1,8,8 - trimethyl-3-azabicyclo[3.2.1]octane hydrochloride, a solution of 356 parts of 2,7-diacetoxyfluoren-9-one in 6750 parts of toluene, and 1500 parts of water in a nitrogen atmosphere is added, with stirring, 475 parts of 85% potassium hydroxide. The resultant mixture is stirred and heated at 90° under reflux in a nitrogen atmosphere for 18 hours, then cooled to room temperature. The toluene phase is thereupon separated from the aqueous phase, and the latter is extracted with toluene. The toluene solutions are combined, washed with aqueous 4% sodium hydroxide, dried over anhydrous sodium carbonate, and filtered. The filtrate is stripped of solvent by vacuum distillation. The residual oily material, crystallized from methanol, affords 2,7-bis[2-(1,8,8-trimethyl-3-azabicyclo[3.2.1]oct-3-yl)ethoxy]fluoren-9-one melting at approximately 142.5–143°. The product has the formula

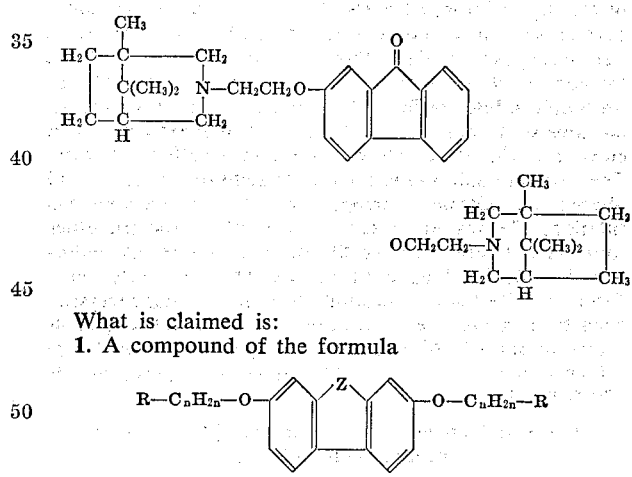

What is claimed is:

1. A compound of the formula

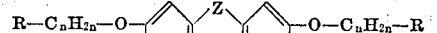

wherein R represents 4-azatricyclo[4.3.1.1³,⁸]undec-4-yl or 1,8,8-trimethyl-3-azabicyclo[3.2.1]oct-3-yl; Z represents carbonyl, hydroxymethylene, or methylene; and $n$ represents an integer greater than 1 and less than 4.

2. A compound according to Claim 1 having the formula

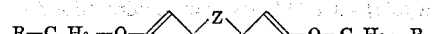

wherein R represents 4-azatricyclo[4.3.1.1³,⁸]undec-4-yl; Z represents carbonyl, hydroxymethylene, or methylene; and $n$ represents an integer greater than 1 and less than 4.

3. A compound according to Claim 1 having the formula

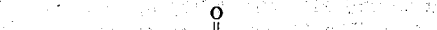

wherein R represents 4-azatricyclo[4.3.1.1³,⁸]undec-4-yl and $n$ represents an integer greater than 1 and less than 4.

4. A compound according to Claim 1 which is 2,7-bis [2 - (4 - azatricyclo[4.3.1.1³,⁸]undec-4-yl)ethoxy]fluoren-9-one.

5. A compound according to Claim 1 which is 2,7-bis [2-(4 - azabicyclo[4.3.1.1³,⁸]undec-4-yl)propoxy]fluoren-9-one.

6. A compound according to Claim 1 which is 2,7-bis [3 - (4-azatricyclo[4,3,1.1³,⁸]undec-4-yl)propoxy]fluoren-9-one.

7. A compound according to Claim 1 having the formula

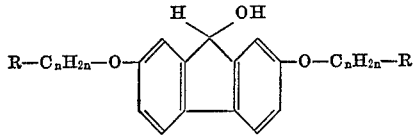

wherein R represents 4-azatricyclo[4.3.1.1³,⁸]undec-4-yl and $n$ represents an integer greater than 1 and less than 4.

8. A compound according to Claim 1 having the formula

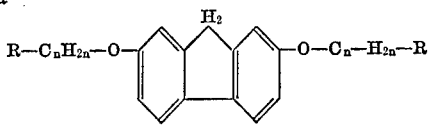

wherein R represents 4-azatricyclo[4.3.1.1³,⁸]undec-4-yl and $n$ represents an integer greater than 1 and less than 4.

9. A compound according to Claim 1 which is 2,7-bis [2 - (4 - azatricyclo[4.3.1.1³,⁸]undec - 4 - yl)propoxy] fluorene.

10. A compound according to Claim 1 which is 2,7-bis [2 - (1,8,8 - trimethyl-3-azabicyclo[3.2.1]oct - 3 - yl)-ethoxy]fluoren-9-one.

References Cited
UNITED STATES PATENTS

| | | | |
|---|---|---|---|
| 3,631,165 | 12/1971 | Berezin | 260—239 B |
| 3,592,819 | 7/1971 | Fleming et al. | 260—294.7 C |
| 3,647,860 | 3/1972 | Sill et al. | 260—475 FR |
| 3,707,471 | 12/1972 | Albrecht et al. | 260—293.62 |

G. THOMAS TODD, Primary Examiner

U.S. Cl. X.R.

260—293.54; 424—244, 267

UNITED STATES PATENT OFFICE
CERTIFICATE OF CORRECTION

Patent No. 3,845,038          Dated Oct. 29, 1974

Inventor(s) Henry W. Sause

It is certified that error appears in the above-identified patent and that said Letters Patent are hereby corrected as shown below:

Column 1, 3rd formula, " ╱S╲ " should be -- ╱Z╲ --.

Column 2, line 19, "sp.; protozoa" should be -- sp.; (2) protozoa --.

Column 3, line 22, "monkey main-" should be -- monkey kidney main- --.

Column 3, line 39, "pH phosphate" should be -- pH 7.4 phosphate --.

Column 3, line 52, "415 millicrons" should be -- 415 millimicrons --.

Column 5, line 20, "fresly" should be -- freshly --.

Column 5, line 64, "0.75 gm.of magnesium" should be -- 0.075 gm. of magnesium --.

Column 7, line 49, "[4.3.1.1$^{2,8}$]" should be -- [4.3.1.1$^{3,8}$] --.

Column 8, first formula, "N-CH$_2$CH$_3$O" should be -- N-CH$_2$CH$_2$O --.

Column 10, line 13, "dihhy" should be -- dihy --.

Column 13, line 10, "[4,3,1.1" should be -- [4.3.1.1 --.

Signed and sealed this 1st day of April 1975.

(SEAL)
Attest:

RUTH C. MASON
Attesting Officer

C. MARSHALL DANN
Commissioner of Patents
and Trademarks